(12) United States Patent
Offer

(10) Patent No.: US 7,164,094 B2
(45) Date of Patent: Jan. 16, 2007

(54) APPARATUS AND METHOD FOR ELECTROFRICTION WELDING

(75) Inventor: Henry Peter Offer, Los Gatos, CA (US)

(73) Assignee: General Electric Company, Schenectady, NY (US)

( * ) Notice: Subject to any disclaimer, the term of this patent is extended or adjusted under 35 U.S.C. 154(b) by 158 days.

(21) Appl. No.: 10/754,548

(22) Filed: Jan. 12, 2004

(65) Prior Publication Data

US 2005/0150871 A1     Jul. 14, 2005

(51) Int. Cl.
*B23K 9/04* (2006.01)
(52) U.S. Cl. ................ 219/76.1; 219/76.13; 219/76.17
(58) Field of Classification Search ............. 219/76.17, 219/76.13, 76.1; 228/112.1
See application file for complete search history.

(56) References Cited

U.S. PATENT DOCUMENTS

| | | | | |
|---|---|---|---|---|
| 3,832,514 A | * | 8/1974 | Antonov | ................. 219/76.13 |
| 4,405,851 A | * | 9/1983 | Sheldon | .................... 219/76.13 |
| 5,102,031 A | * | 4/1992 | Heitman et al. | ............. 228/175 |
| 5,448,035 A | * | 9/1995 | Thutt et al. | ............... 219/76.13 |
| 6,417,477 B1 | * | 7/2002 | Brown et al. | ............ 219/76.13 |

* cited by examiner

*Primary Examiner*—Len Tran
(74) *Attorney, Agent, or Firm*—Harness, Dickey & Pierce

(57) ABSTRACT

An apparatus and method arranged to use a combination of at least electrical resistance heating and mechanical friction heating to case a base material and/or a consumable material to reach a combination of temperature and pressure sufficient to cause welding. The method and apparatus configured for the simultaneous or substantially simultaneous application of both electrical resistance heating and friction heating to achieve welding is referred to as an electrofriction process, method or apparatus. This combination of resistance and friction heating allows the heating to be more localized within a relatively small weld zone, thereby improving the efficiency of the overall process and allowing the size, weight and strength and/or the cost of the application equipment and/or associated fixtures and power supplies to be reduced while enhancing its capability for operation in confined spaces and providing satisfactory welding performance.

20 Claims, 11 Drawing Sheets

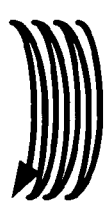 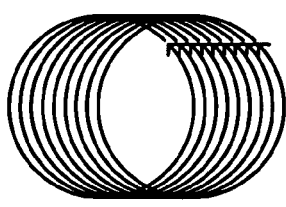 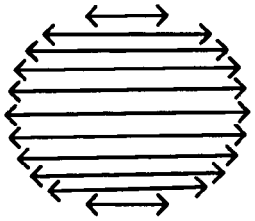 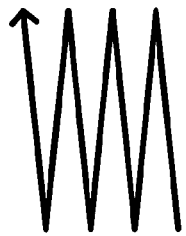
FIG. 2B
FIG. 2C
FIG. 2D
FIG. 2E
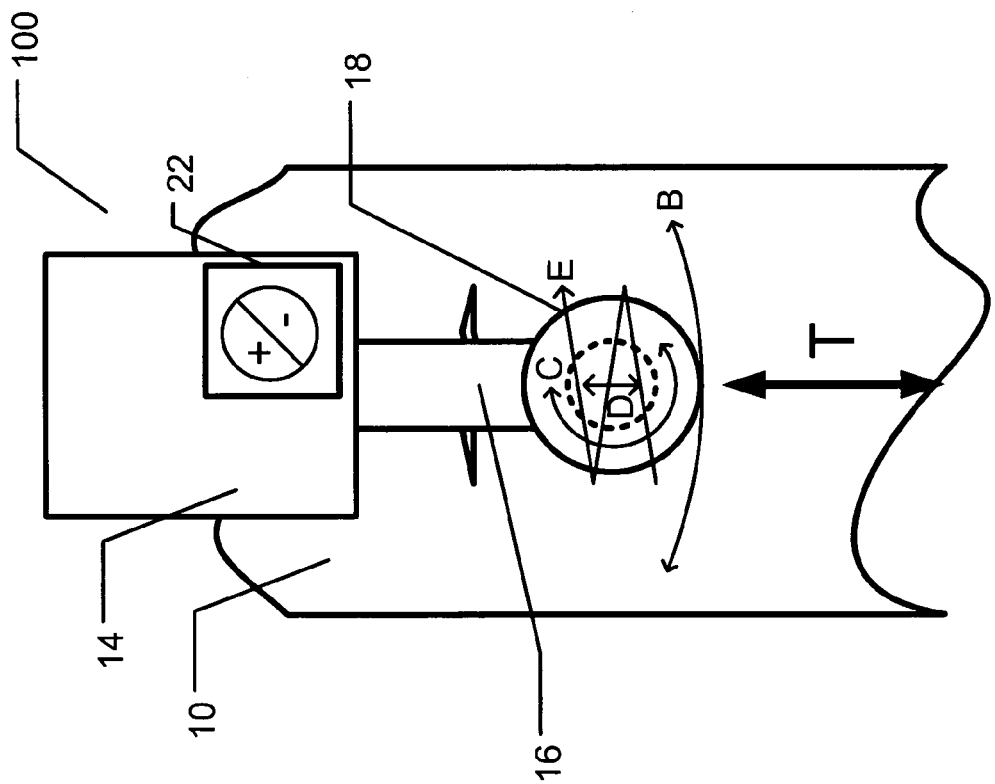
FIG. 2A

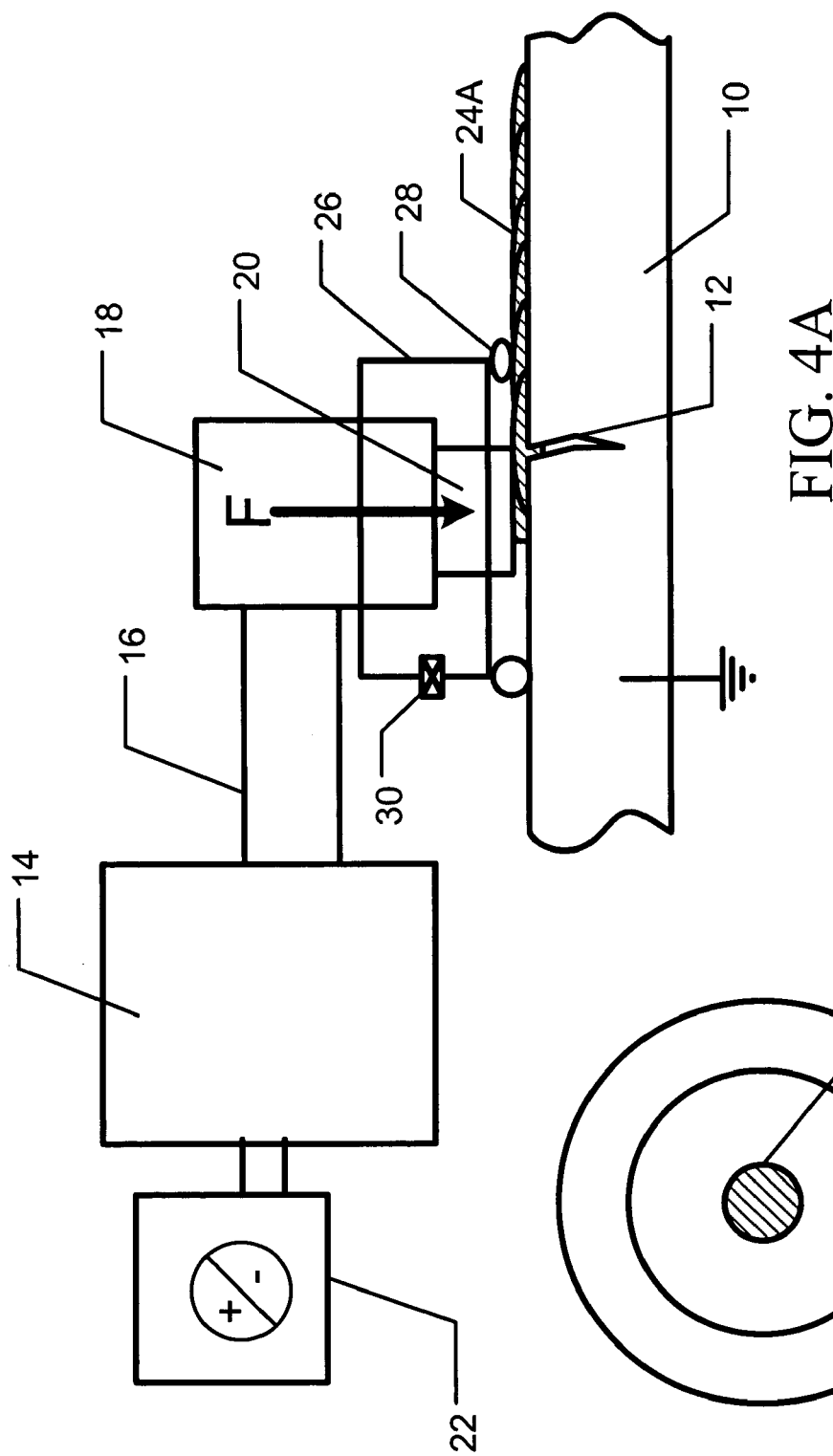

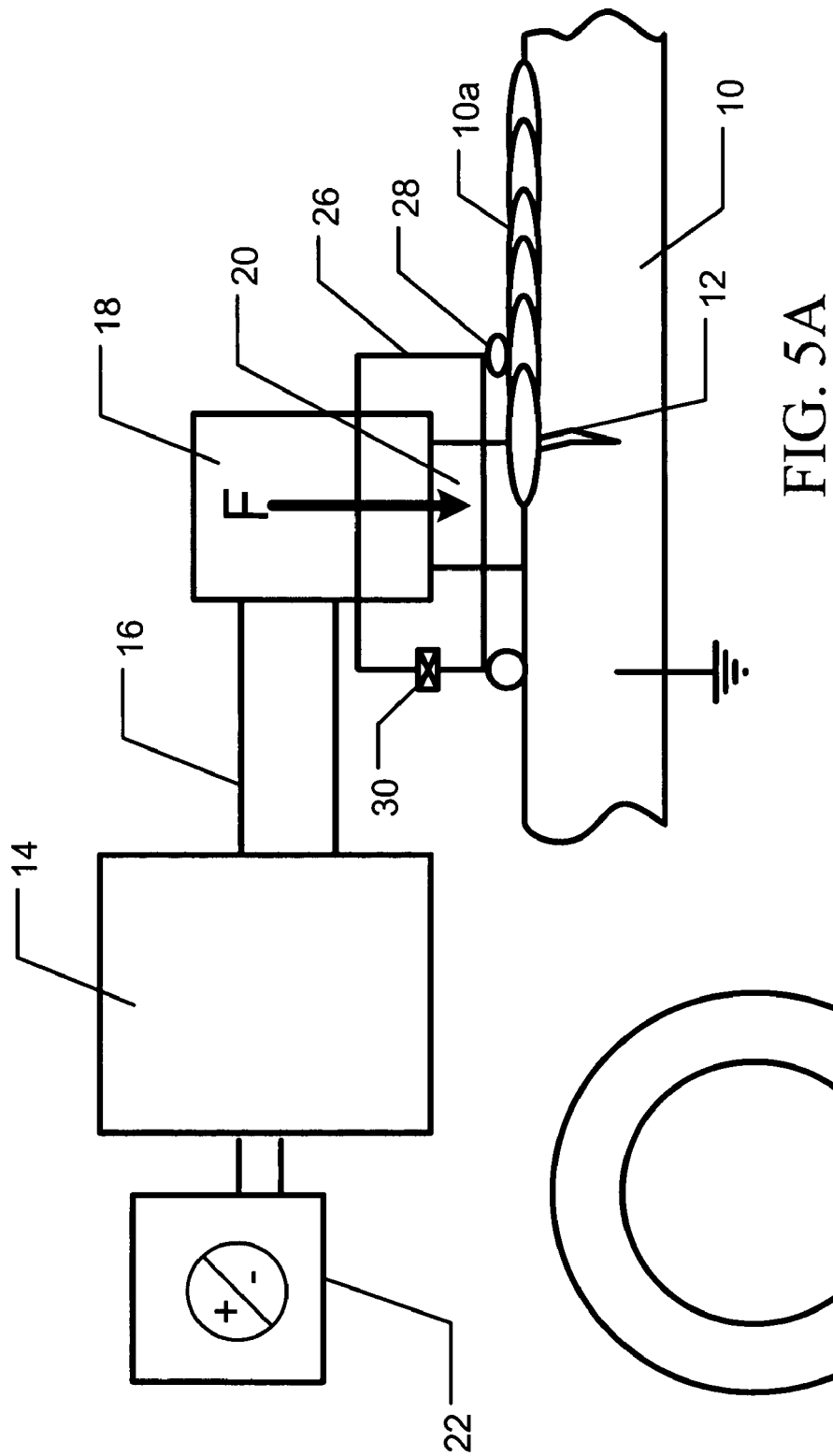

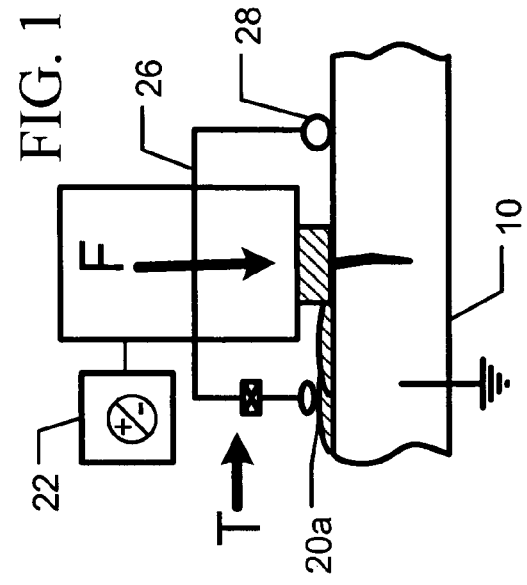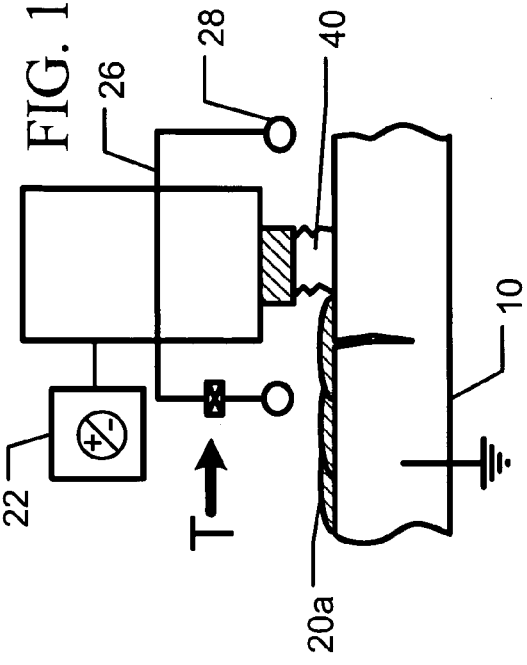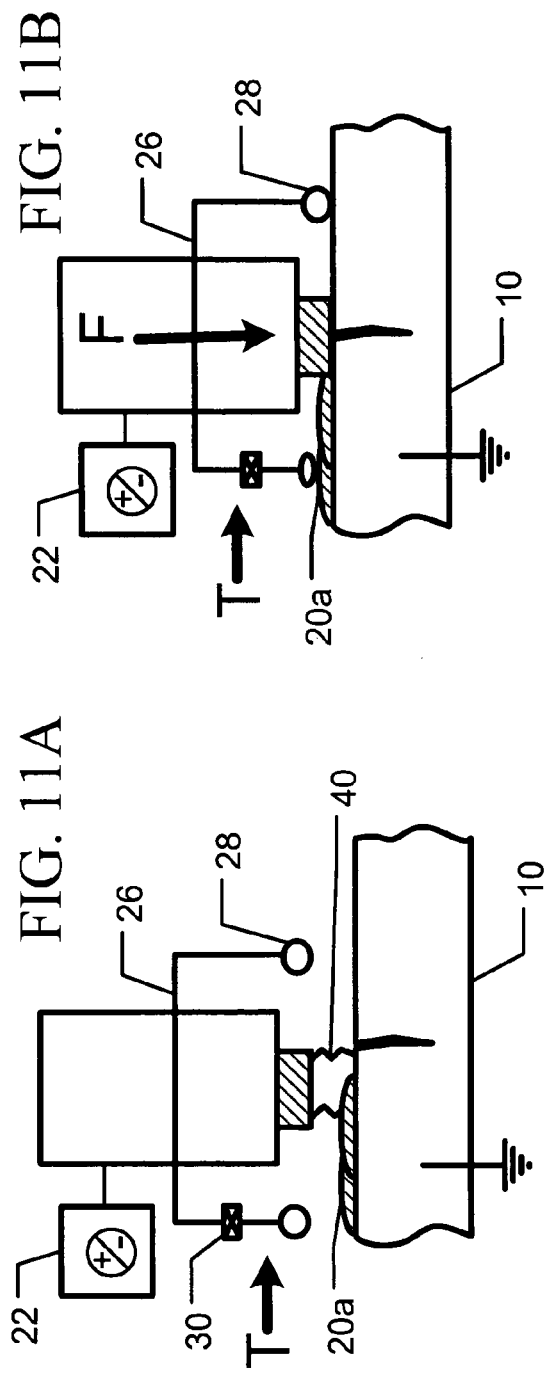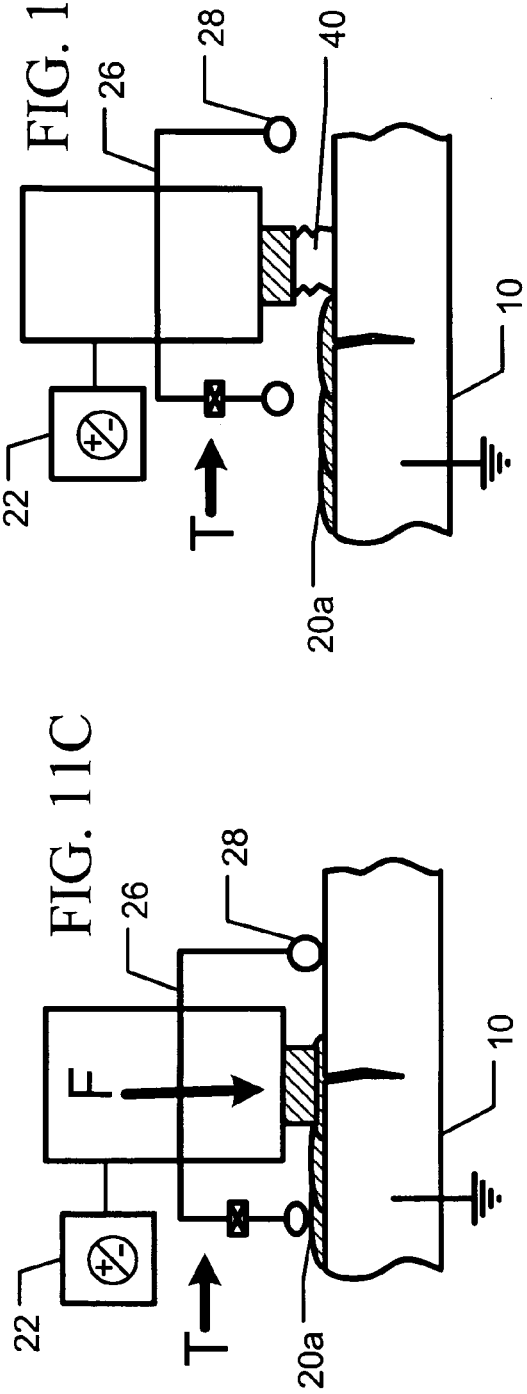

APPARATUS AND METHOD FOR ELECTROFRICTION WELDING

TECHNICAL FIELD AND INDUSTRIAL APPLICABILITY OF THE INVENTION

The present invention relates generally to welding, and more particularly to an apparatus and a method for solid state or semi-solid state welding that utilizes a combination of electrical resistance and mechanical friction to achieve the heating necessary for welding.

BACKGROUND OF THE INVENTION

Conventional friction welding relies on very high magnitude applied forces and mechanical torques, or, alternatively, lateral vibratory forces, to produce the desired hot forging temperature and pressure conditions within a weld zone. The relative motion of the contacting surfaces in the weld zone is typically slow, and, as a result, a large fraction of the heat generated is lost during the welding process, i.e., by thermal conduction into the base metal(s), consumable filler material and/or non-consumable probe. The corresponding broadening of the width, increase in the time, and increase in temperature of the weld heat-affected zone (HAZ) can be highly undesirable, particularly for materials that are susceptible to chemical dilution, thermal sensitization or helium embrittlement. Such thermal inefficiency also increases the power required to deposit a desired bead. In addition, the size and weight of the tooling required to apply the necessary normal forces and vibratory motion and/or torque will tend to be substantial.

Conventional resistance welding relies on a combination of large electrical currents and applied forces to produce the required temperature and pressure conditions for hot forging within a weld zone. Due to the lack of relative motion between the mating surfaces, resistance welding typically provides no significant cleaning action of the mating surfaces and does not tend to produce a well homogenized material in the weld zone. As a result, even higher applied forces and higher corresponding contact pressures are required to obtain an internally clean weld nugget having acceptable mechanical properties for demanding applications. Because of the high applied forces required by these conventional welding processes, the tooling to apply them is correspondingly large and heavy and generally inappropriate for remotely-applied welds in limited-access areas where a semi-solid state weld may be required.

With these conventional semi-solid state welding methods, any significant reduction in the size and weight of the associated tooling requires a corresponding reduction in the weld size and/or the process productivity. A simplistic "scaling" approach for developing tools for confined spaces will tend to result in tooling of a size which is impractical or impossible to use for remote field applications in limited access areas. For example, tooling of size and strength sufficient to provide satisfactory weld size and productivity will tend to be too large to operate in confined areas. Conversely, tooling that has been reduced in size to a degree sufficient to operate in confined areas will tend to exhibit weld size and productivity that are undesirable or unacceptable for meeting "critical path schedules."

However, no apparatus or method heretofore has been known to overcome the problems of either conventional resistance or friction semi-solid state welding with respect to production of weld joints or application of weld cladding in remote and/or confined locations where process tooling and delivery equipment size, weight, and reaction force values must be kept to a minimum, while also providing high productivity and high weld quality.

SUMMARY OF THE INVENTION

At least one exemplary embodiment of the present invention provides a method for semi-solid state welding that uses both electrical resistance and mechanical friction as the sources of heat. A method of welding a solid consumable material to a weld region on a base material including bringing a working surface of the consumable material into contact with the weld region on a surface of the base material under a contact force, the contact force being applied generally along an axis substantially normal to the weld region; moving the working surface relative to the weld region while maintaining the contact and applying the contact force, thereby generating a quantity of frictional heating within the welding zone; and establishing an electrical current through the consumable and base materials including or adjacent the welding zone, thereby generating a quantity of resistance heating within the welding zone; wherein a cumulative heating of the welding zone by the frictional heating and the resistance heating, in combination with the forging action of the contact force, are sufficient to cause welding of a portion of the consumable material to the surface of the base material within the welding zone.

Other exemplary embodiments of methods of electrofriction welding according to the present invention include moving the working surface of the consumable material relative to the surface of the base material using at least one motion selected from a group consisting of rotation, translation, oscillation, orbital rotation and arcuate motion, moving the working surface of the consumable material along the surface of the base material to form an elongated weld bead, wherein the working surface has a maximum dimension $D_m$ and the elongated weld bead has a width W generally corresponding to the $D_m$ and a length L that is substantially larger than the $D_m$ to form an elongated weld bead that is straight, curved or a combination of straight and curved regions. Other weld beads that may be formed using a method according to the present invention may have a width W of at least twice the $D_m$ and a length L that is substantially larger than the $D_m$ and may include straight, curved or a combination of straight and curved regions.

Other exemplary embodiments of methods of electrofriction welding according to the present invention include preheating the weld region, preheating a portion of the consumable material, the preheated portion including the working surface or preheating both the weld region and the consumable material using at least one method selected from induction heating, plasma arc heating, electric arc heating, tungsten inert gas (TIG) torch heating, laser heating or electron beam (also referred to as power beam) heating, and applying the consumable material to the welding zone. The consumable material may be applied to the welding zone by various means including contacting the weld region with a solid element prepared from the consumable material, extruding a viscous composition prepared from the consumable material onto the weld region, or emitting a powder composition prepared from the consumable material onto the weld region and may be applied through an opening provided in a contact element.

At least one exemplary embodiment of the present invention provides an apparatus for electrofriction welding of a consumable material onto a surface of a base material including a contact element; a contact element housing, the contact housing arranged and configured to hold the contact element, selectively move the contact element in a plane substantially parallel to the surface, selectively force a working surface of the contact element against the surface in a weld zone with a contact force, the contact force being applied in a direction substantially normal to the surface, wherein the working surface of the contact element moves under a force applied in the direction of motion while in contact with the surface to generate frictional heating; an electrode; and an electrical power supply, the electrical power supply being connected to the electrode and arranged to produce an electric current into the base material in the region of the weld zone; wherein the electric current causes resistance heating of the weld zone, and further wherein the combination of frictional heating, resistance heating and contact force is sufficient to cause semi-solid state welding of the consumable material onto the weld zone. An apparatus for the electrofriction welding of a consumable material may also include one or more supplemental heating elements arranged in close proximity to the contact element for the preheating of the weld zone, further wherein the combination of preheating, frictional heating, resistance heating and contact force is sufficient to cause semi-solid state welding of the consumable material onto the weld zone.

BRIEF DESCRIPTION OF THE DRAWINGS

The advantages of this invention will be apparent upon consideration of the following detailed disclosure of the invention, especially when taken in conjunction with the accompanying drawings wherein:

FIGS. 2A–E illustrate certain of the modes of substantially horizontal movement of the electrofriction welding apparatus relative to the substrate;

FIGS. 4A and 4B illustrate another exemplary embodiment of the electrofriction welding apparatus and detail regarding the associated contact rod;

FIGS. 5A and 5B illustrate yet another exemplary embodiment of the electrofriction welding apparatus and detail regarding the associated contact rod;

FIGS. 11A–D illustrate steps in an intermittent or step-wise electrofriction process according to an exemplary embodiment of the present invention that includes auxiliary arc heating.

Figure 1A:
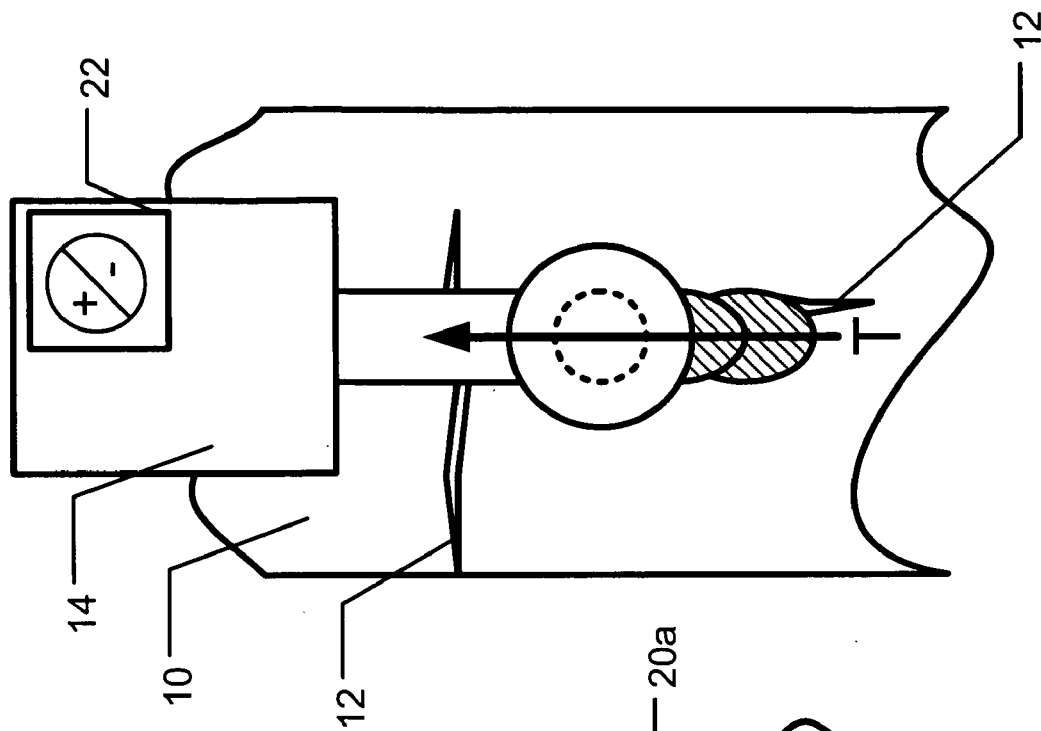
FIG. 1A is a side view of an electrofriction welding apparatus according to an exemplary embodiment of the present invention.

These figures are provided for illustrative and descriptive purposes only and are not drawn to scale. Indeed, the relative sizing and positioning of the various mechanical components may be reduced and/or exaggerated to highlight the described interaction and operation of the disclosed exemplary embodiments of the electrofriction welding apparatus and the associated method.

DETAILED DESCRIPTION OF EXEMPLARY EMBODIMENTS

Exemplary embodiments of the invention provide an apparatus for applying a combination of electrical resistance heating and mechanical friction heating at the same time and location or at substantially at the same time and place, to produce heating sufficient to support solid state or semi-solid state welding. By utilizing a combination of heating modes, the exemplary embodiments of the apparatus may achieve synergistic heating that may provide improved welding efficiency, improved welding productivity and/or tooling of a scale suitable for operation in remote and/or confined locations. This simultaneous application (e.g., combination) of electrical resistance and mechanical friction heating modes to apply the necessary heating to support welding will be referred to herein as "electrofriction welding"

Electrofriction welding uses both mechanical friction heating and electrical resistance heating simultaneously, or substantially simultaneously, to heat and forge base metal(s) and/or a filler metal within a weld zone or weld interface. The combination of resistance heating in addition to friction heating allows the heating to be localized more effectively at the weld interface. By using this combination heating scheme, therefore, it is possible to reduce the overall heat loss (especially by conduction into the unmelted base metal) and thereby allow for more rapid welding while consuming less total energy. The result is an electrofriction solid state or semi-solid state welding process that can provided increased productivity, greater weld size capability and increased thermal and energy efficiency.

In the electrofriction process, because the resistance heating source and the friction heating source are applied at the same time, or nearly the same time, and in substantially the same location, conduction, convection, and radiation heat losses during the dwell time (i.e., the time between heating a contact area using resistance ends and heating the contact area using friction heating begins), may be reduced and, in some cases, may be eliminated. Further, the electrofriction process allows the specific energy contributed by one of the heating processes to be reduced by an amount generally comparable to specific energy that is being contributed by the other process, while still maintaining a substantially constant weld pass size.

For example, if the heating processes were applied separately as the dwell time increases, the heat lost between the termination of the first heating process and the initiation of the second heating process may begin to approach or exceed the heat input required from the second heating process to bring the working zone of the substrate from an intermediate preheat temperature to a full forging temperature. This effect may be addressed by reducing the thermal losses, especially losses resulting from the conduction of heat into the base metal(s).

The electrical resistance heating component of an electrofriction process permits the frictional heating component of the heat input to be reduced while still achieving the needed forging temperature within the working zone of the substrate. This reduction translates directly into a reduction in the power required to generate the friction and/or the applied forces (both perpendicular and parallel to the work surface) necessary to achieve the desired combination of heating and pressure and corresponding plastic flow in the work surface. This improved efficiency allows the tooling size and weight, and in some cases, the cost of the tooling and the ancillary equipment to be reduced. As a result, an electrofriction process according to the present invention is particularly suitable for use in physically remote areas with limited access, e.g., inside a nuclear reactor. Moreover, by permitting the use of application equipment of reduced size, the number and/or the strength of the necessary tool mounting points may be correspondingly reduced.

The friction welding component of an electrofriction process according to the present invention provides improved cleaning and mixing of the faying surfaces at the forged zone. The combination of pressure and relative motion between the working surface of the electrode and the working surface of the substrate tends to remove or extrude surface contaminants from the weld zone. Because the weld zone is being continuously deformed by the pressure and relative motion of the electrode, sufficient mixing of the substrate and filler metal occur. The resulting reduction in weld zone defects, as well as the metallurgical improvement achieved by grading the composition gradient for dissimilar weld joints, provides stronger and longer-lasting joints that are more suited for severe-duty service.

Figure 1B:
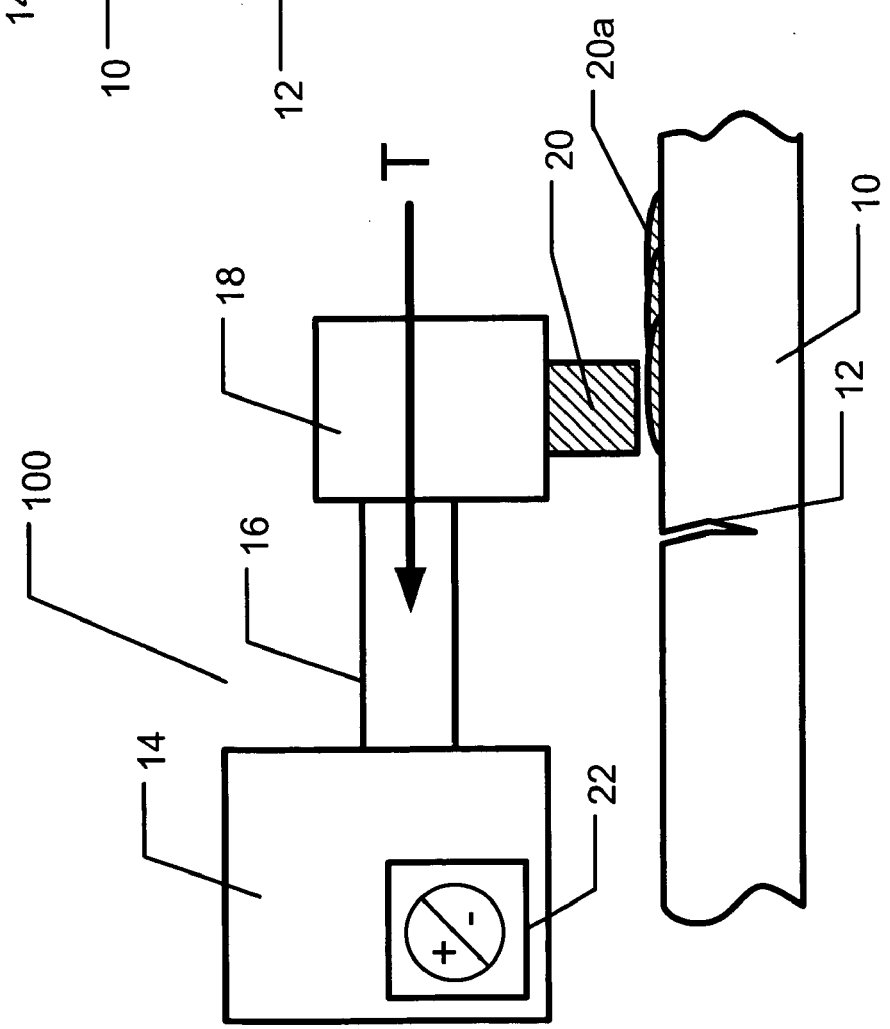
FIG. 1B is a plan view of the electrofriction welding apparatus illustrated in FIG. 1A.

As illustrated in FIGS. 1A and 1B, in exemplary embodiments of an electrofriction welding process according to the invention, a contact rod 20 supported and positioned by an electrofriction welding apparatus 100 will be positioned adjacent a work piece or substrate 10 that may include one or more defects 12. When a defect 12 is present, particularly an elongated defect, the electrofriction welding apparatus 100 may be oriented so that a primary track direction T is aligned with the defect.

The electrofriction welding apparatus 100 may include a primary housing 14, a positioning arm 16 and an electrode housing 18. The primary housing 14 may be configured for attachment to various mounting points (not shown) to allow for rough positioning of the electrofriction welding apparatus, with the positioning arm(s) 16 providing for fine positioning of the contact rod housing 18 relative to the substrate 10. The contact rod housing 18 may include positioning mechanisms (not shown) for the extension and retraction of the contact rod 20 (which is not necessarily cylindrical) relative to the contact rod housing as well as mechanisms for rotating, oscillating or otherwise moving the contact rod relative to the substrate 10.

The electrofriction welding apparatus may utilize a consumable contact rod 20 that is selected and formulated to transfer a portion of the contact rod material 20a onto the substrate 10 during each welding cycle. Alternatively, the electrofriction welding apparatus may utilize a substantially non-consumable contact rod 20 that is capable of applying sufficient pressure and heat to the substrate 10 to achieve solid state or semi-solid state welding of the substrate material. During a welding cycle, the contact rod 20 may be rotated at a high speed and then brought into contact with a portion of the substrate 10 to generate friction heating. Alternatively, the contact rod 20 may be brought into contact with the substrate 10 and then moved relative to the substrate using one or more linear, rotational or arcuate movements.

As illustrated in FIG. 2A, the motion of the contact rod 20 relative to and generally locally parallel to the surface of the substrate 10 may include an arcuate sweeping motion, B, a rotational movement about a contact rod central axis, C, an orbital motion about a non-central axis (not shown), a linear motion, D, or a zig-zag motion, E. As illustrated in corresponding FIGS. 2B–E, each of these motions will impart to the contact rod 20 a distinct motion relative to the substrate as the electrofriction welding apparatus advances along the substrate in direction T. As will be appreciated, these various motions may be utilized separately or in combination and may involve movement of the contact rod 20 within the contact rod housing 18, movement of the contact rod housing relative to the positioning arm 16, and/or movement of the positioning arm relative to the primary housing 14.

In combination with the movement of the contact rod 20 generally parallel or horizontal to the surface of the substrate 10, the electrofriction welding apparatus 100 may also be configured to move the contact rod and/or the contact rod housing in a direction generally normal or vertical to the surface of the substrate. The mechanism utilized to achieve this normal motion will be of sufficient strength and power to force the working surface of the contact rod 20 against the surface of the substrate 10 with sufficient pressure to obtain the desired friction heating and weld forging pressure.

Figures 3A, 3B:
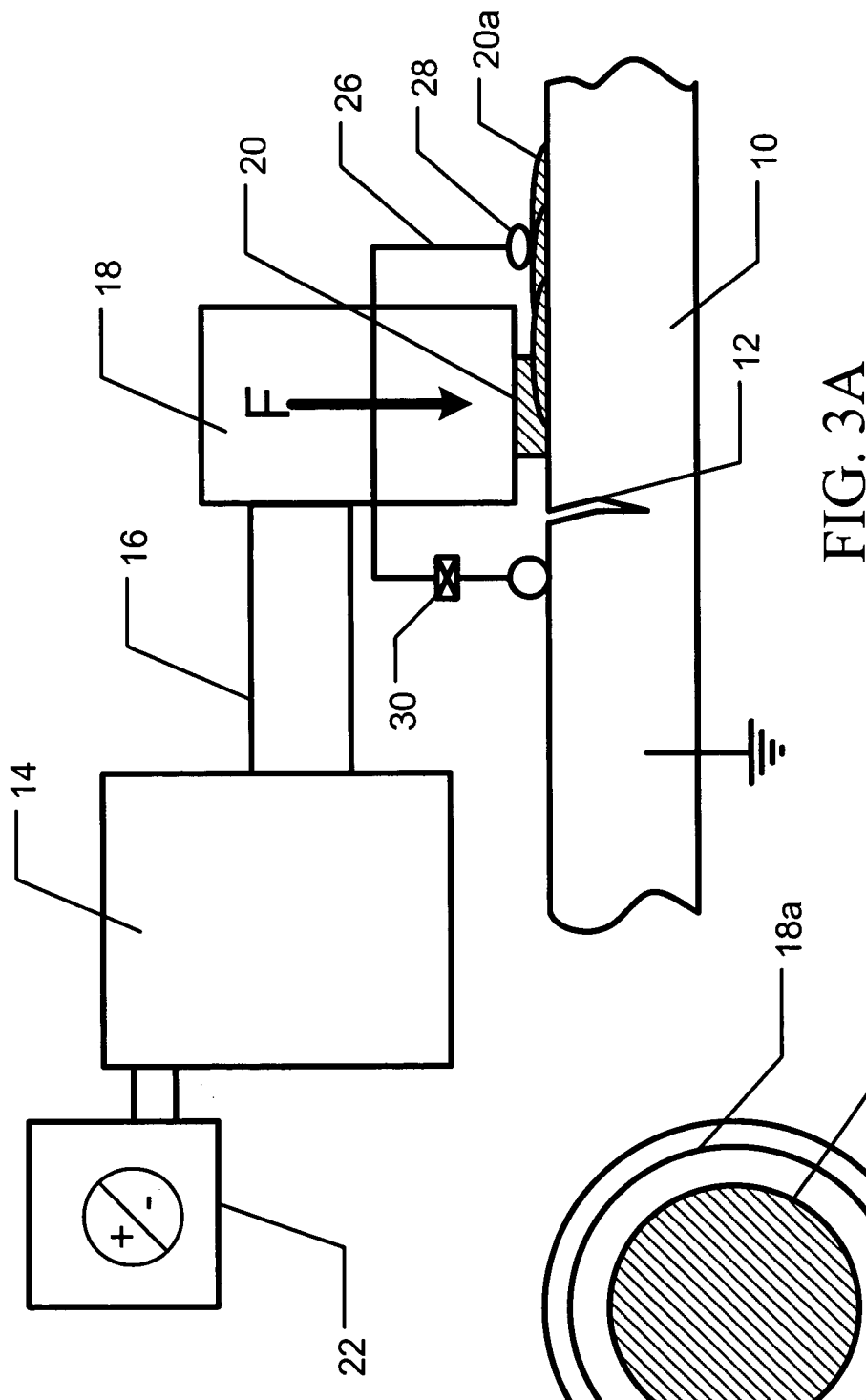
FIGS. 3A and 3B illustrate an exemplary embodiment of the electrofriction welding apparatus and detail regarding the associated contact rod.

As illustrated in FIG. 3A, the electrofriction welding apparatus may be configured to apply a force F along an axis generally normal to the surface of the substrate 10 and extending through the contact rod 20 comprising a consumable material. As the electrofriction welding apparatus 100 advances along the surface of the substrate 10, a series of welding cycles will deposit a series of beads 20a of the consumable material along the surface. As illustrated in FIGS. 3A and 3B, the contact rod 20 may be configured and held within and advanced from the contact rod housing 18 as needed. The contact rod 20 may be configured to interact with mechanisms within the contact rod housing 18 whereby the contact rod may be rotated relative to the contact rod housing. Alternatively, the contact rod 20 may be fixed relative to a rotatable portion 18a of the contact rod housing 18, that is rotated within the contact rod housing 18 or simply fixed relative to the contact rod housing which is, in turned, moved in linear, rotational, orbital or sweeping directions, either singly or in combination, to provide the necessary motion relative to the substrate 10.

As illustrated in FIG. 3A, the electrofriction welding apparatus 100 may also incorporate a housing 26, which may include sealing elements 28 along the lower periphery, for defining a chamber containing the weld zone and some adjacent portions of the substrate 10 surface. The housing 26 may incorporate one or more valves 30 for the exhaust of fluids, particularly steam, from within the housing during welding operations. Particularly for the welding of submerged surfaces, the housing 26 is useful for excluding the surrounding fluids, thereby improving the quality of the weld and limiting the amount of heat lost through transfer to the fluid through heating or vaporization.

In addition to the contact rod 20 movement and pressure against the substrate 10, at the same time, or at substantially the same time, the contact rod is being forced against the substrate by the electrofriction welding apparatus 100, an electrical current will be passed through the substrate surface, which is typically grounded, to provide resistance heating of the weld zone. The contact rod 20 may be utilized as an electrode for passing electrical current into the substrate and/or electrode contact may be established between electrode regions (not shown) provided on the contact rod housing 18. The electrical current will preferably pass through a substrate region at or adjacent the area where the contact rod is in contact with the substrate. The electrical current may be supplied by a power source 22, which may be incorporated within the primary housing 14 or may be provide more remotely, and electrically connected to the contact or electrode elements of the electrofriction welding apparatus 100.

As illustrated in FIG. 3A, the combination of the friction heating and the resistance heating, in combination with a consumable contact rod 20 of appropriate composition and the contact pressure near the location where the contact rod contacts the substrate 10 will cause a portion 20a of the contact rod to be welded to the substrate. The newly applied consumable material 20a preferably provides a substantially defect-free layer of material that may, depending on a particular design, also have improved composition and/or microstructure, relative to the original substrate 10.

As illustrated in FIGS. 4A and 4B, in another exemplary embodiment of the electrofriction welding apparatus 100, the contact rod 20 may be configured to provide an outer, non-consumable portion through which a separate consumable material 24 may be passed or fed during the welding process. The consumable material may be in solid form (e.g., slug or bar form) or in powder form (or viscous material including powder). The increased temperature generated by the combination of electrical resistance and mechanical friction at the interface of the substrate 10, the contact rod 20, and if in solid form, the consumable material 24, will deform the consumable material and weld a portion 24a to the substrate. The newly applied consumable material 24a preferably provides a substantially defect-free layer of material that may, depending on a particular design, also have improved composition and/or microstructure, relative to the original substrate 10.

As illustrated in FIGS. 5A and 5B, in another exemplary embodiment of the electrofriction welding apparatus 100, the contact rod 20 may be configured to provide a substantially uniform non-consumable surface that will be applied to the substrate 10 surface during the welding process. The increased temperature generated by the combination of electrical resistance and mechanical friction at the interface of the substrate 10 and the contact rod 20 will deform surface regions 10a of the substrate to form the weld bead. The newly welded portions 10a of the substrate 10 will preferably provide a substantially defect-free layer and more homogeneous layer of material that may, depending on a particular design and the welding conditions, exhibit an improved composition and/or microstructure, relative to the original substrate 10.

With each of the exemplary embodiments illustrated in FIGS. 3A, 4A and 5A, the electrofriction welding apparatus 100 may be moved along the substrate 10, e.g., along axis T, as the welding cycle is repeated intermittently or substantially continuously until the surface and/or near-surface defects and discontinuities 12 in the substrate 10 are sealed or otherwise corrected. Although a substantially continuous process is illustrated, in some cases, discontinuous or incremental operation of the electrofriction welding apparatus 100, such as daubing, may be used to form a series of welds, which may be isolated from one another or which may be spaced so as to partially overlap adjacent welds.

When the positioning arm 16 is configured to provide controlled movement over a broad area of the substrate 10, the welding process may be substantially continuous as the contact rod 20 traces an orderly pattern on the substrate. During continuous operation, it is anticipated that electrical resistance heating providing a significant portion of the heat generation to reduce the need for tooling capable of applying high levels of torque and pressure. The incremental method can be used to advantage for example when the tooling must be kept extremely compact, and the power source must have time between welding increments, e.g., dwell time, to regenerate its energy capacity to a level sufficient to support the next welding cycle. Discontinuous or incremental operation may be beneficial in certain applications including, for example, when sealing liquid-containing crevices in which the liquid may vaporize when heated and disturb or contaminate the weld zone, an incremental method allows sufficient time for the vapor pressure to subside while the recently heated area cools.

Figure 6A:
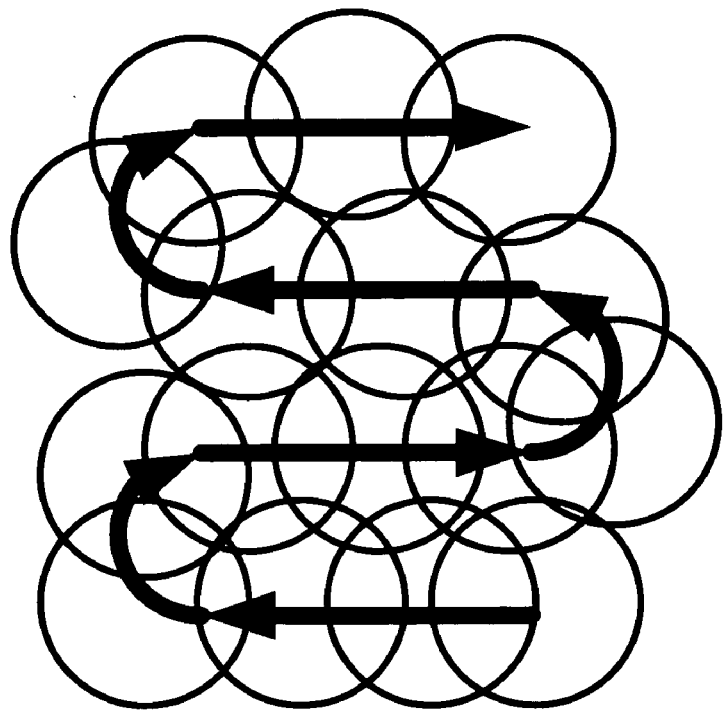
FIG. 6A is a schematic illustration of a translating "up-and-down" (raster) pattern of movement for an electrofriction apparatus across a substrate.
Figure 6B:
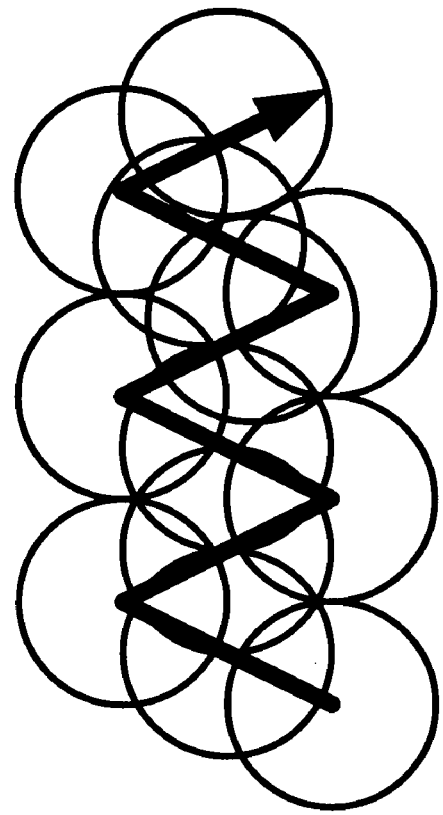
FIG. 6B is a schematic illustration of a "zig-zag" (triangular or saw-tooth) pattern of movement for an electrofriction apparatus across a substrate.

The general direction of motion of the electrofriction welding apparatus 100 does not have to be strictly linear, i.e., along direction T, as is depicted in FIGS. 1B and 2A. Indeed, electrofriction welding apparatus 100 may be moved across the surface of the substrate in a number of directions to form various patterns. Examples of suitable patterns of motion include a translating "up-and-down" or "raster" pattern as illustrated in FIG. 6A or a "zig-zag" or "saw tooth" pattern as illustrated in FIG. 6B. In addition, the horizontal movement and discontinuous operation of the electrofriction welding apparatus 10 may be coordinated with one or more repetitive motions away from and back to the work surface for producing a weld comprising a series of separate, but partially overlapping, weld segments.

Figure 7:
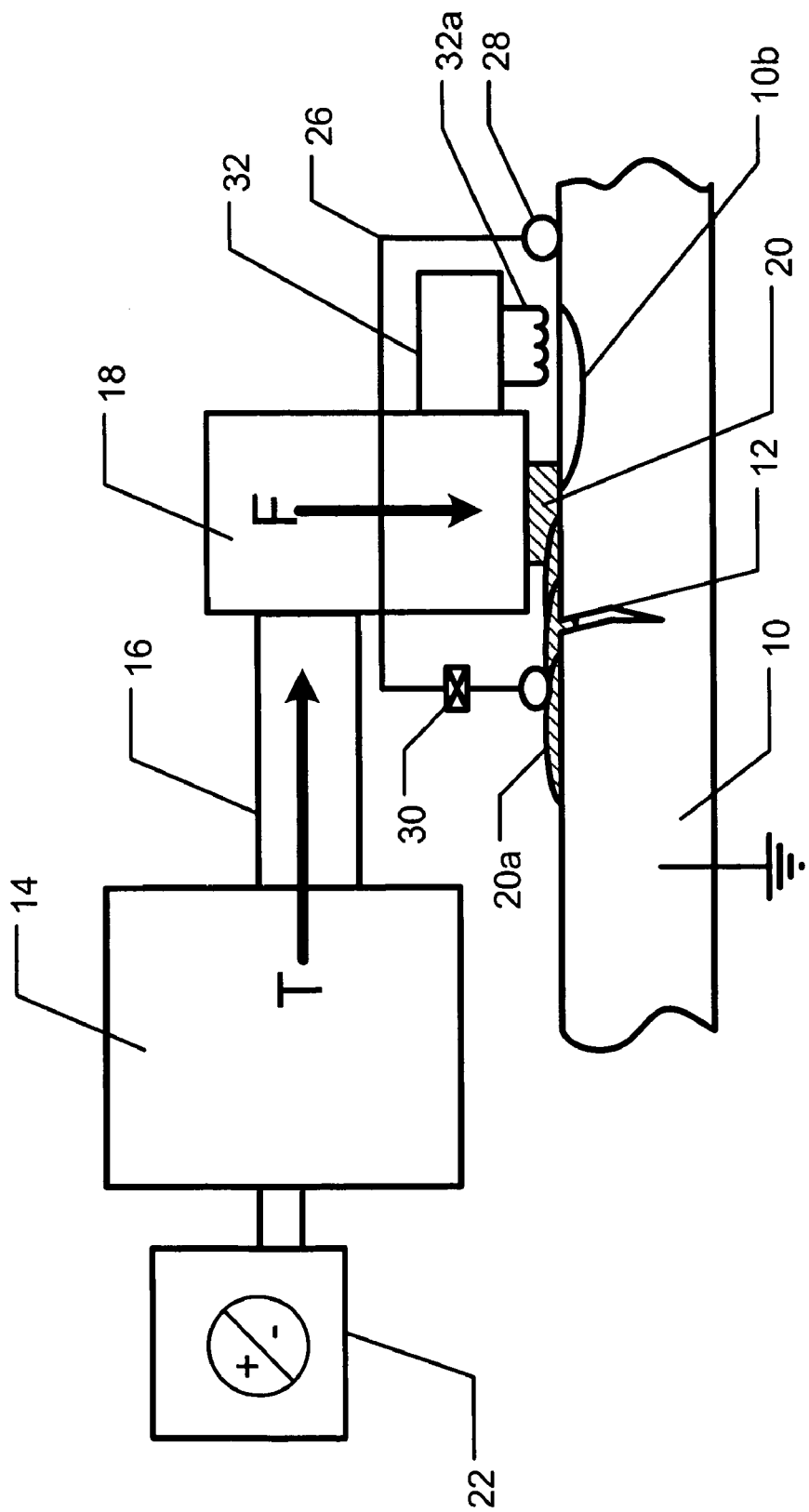
FIG. 7 illustrates an electrofriction welding apparatus according to an exemplary embodiment of the present invention in which an induction coil preheats the substrate.
Figure 8:
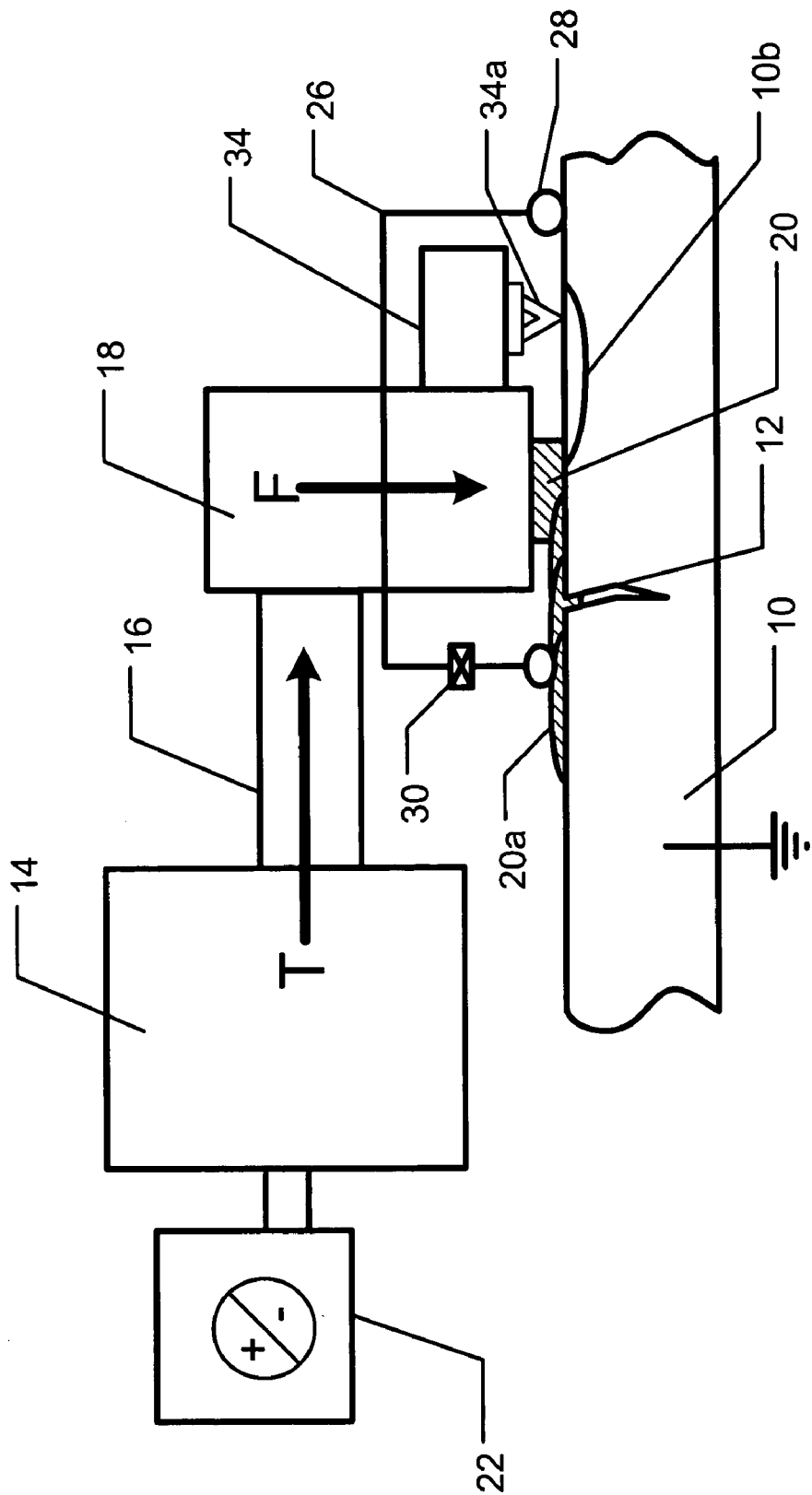
FIG. 8 illustrates an electrofriction welding apparatus according to an exemplary embodiment of the present invention in which a torch preheats the substrate.
Figure 9:
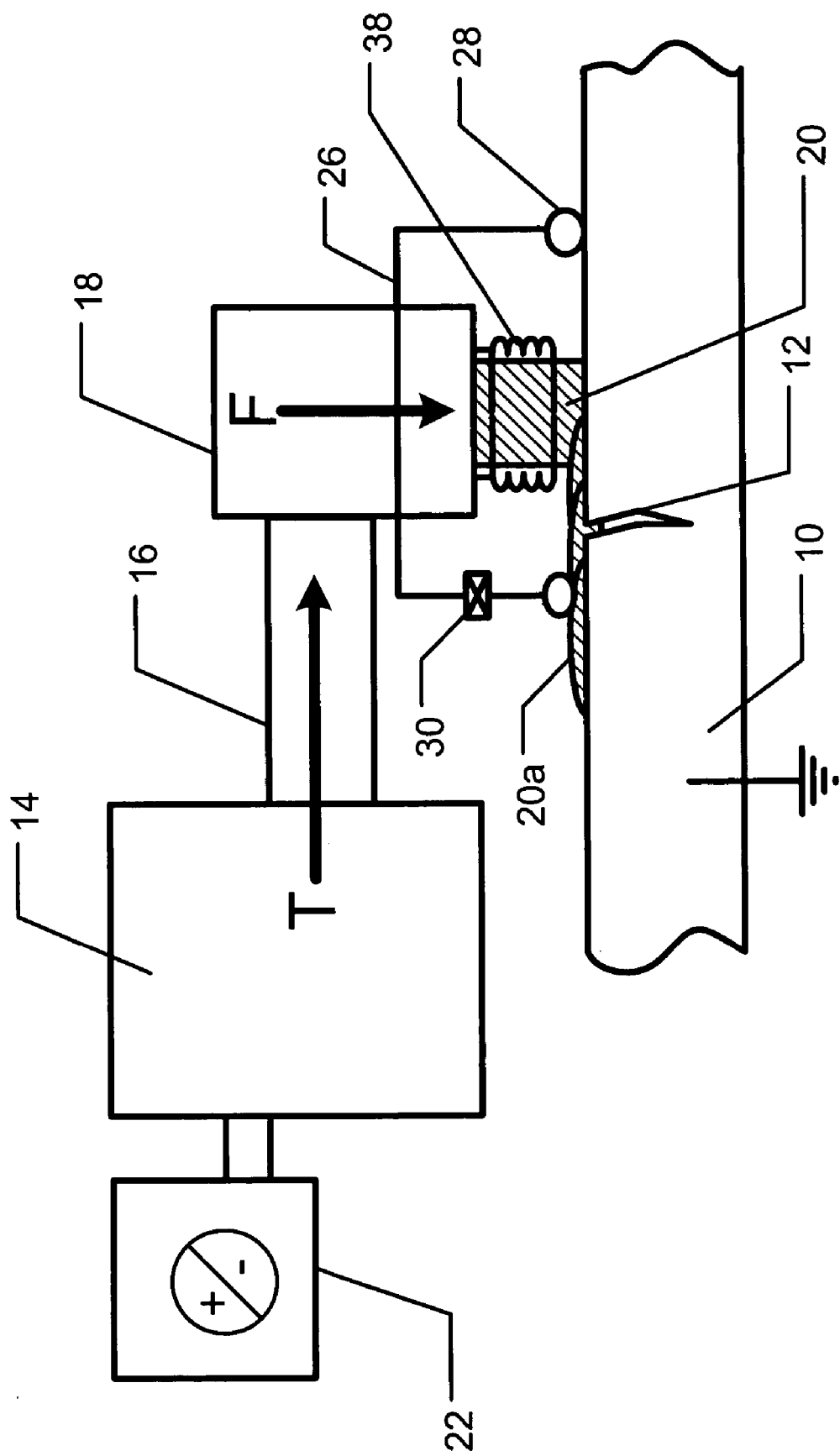
FIG. 9 illustrates an electrofriction welding apparatus according to an exemplary embodiment of the present invention in which an induction coil preheats the consumable material.

As illustrated in FIGS. 7–9, the electrofriction welding apparatus may also be provided with means for providing localized heating to supplement the friction and resistance heating in the weld zone including, for example, induction heating, plasma arc heating, electric arc heating, tungsten inert gas (TIG) torch heating, laser heating or electron beam (power beam) heating. For example, an induction assembly 32 having an induction coil 32a may be positioned adjacent the contact rod housing 18 to heat a region 10b of the substrate before substantial heating is supplied to the same region by the resistance and frictional heating means of the electrofriction welding apparatus 100.

Alternatively, as illustrated in FIG. 8, a plasma torch 34 capable of producing flame 34a can be affixed to the electrofriction welding apparatus 100 to provide additional heat selectively to a region 10b of the substrate 10 prior to substantial heat being applied by electrical resistance and mechanical friction. In yet another alternative embodiment illustrated in FIG. 9, an inductive coil may be provided on or adjacent the contact rod housing 18 for heating the contact rod 20 prior to exiting or as it exits the contact rod housing. Other embodiments of the apparatus according to the invention may employ another of the supplemental heating methods, such as plasma arc heating, electric arc heating, tungsten inert gas (TIG) torch heating, laser heating or electron beam (power beam) heating for the same purpose. It will be appreciated that these supplemental heating methods are not exclusive and may be used in combination to obtain the desired level of heating within the weld zone.

The supplemental heating, by whatever means, is preferably limited so as to avoid more than minor melting of the substrate 10. An alternate or supplemental preheating step may reduce the heat energy that must be derived from the frictional and resistance heating in order to weld a portion of the consumable to the target surface, thereby allowing a reduction in the cost, size and weight of the electrical and/or frictional tooling required to practice the electrofriction welding method. It is preferred, however, to avoid or limit the use of such non-simultaneous preheating because of the associated decrease in the overall thermal efficiency as a result of thermal losses during the time between the preheating and welding steps.

Figure 10A:
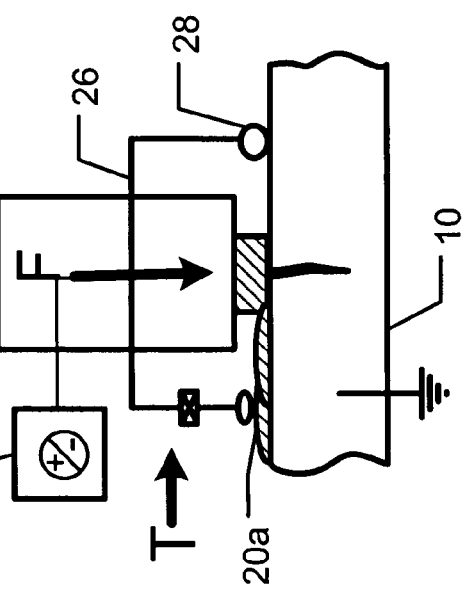
FIGS. 10A–D illustrate steps in an intermittent or step-wise electrofriction process according to an exemplary embodiment of the present invention.
Figure 10B:
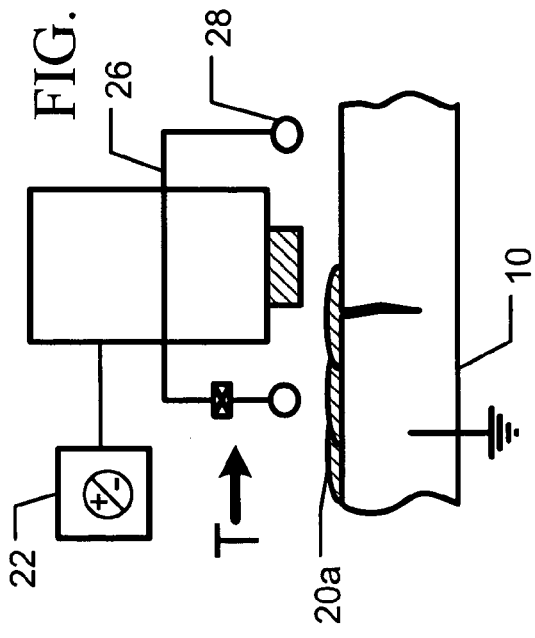

Certain of the steps included in an intermittent contact electrofriction process as described above are illustrated in FIGS. 10A–D. As illustrated in FIG. 10A, a welding step has been completed and the contact rod 20 has been withdrawn from the substrate 10. The electrofriction welding apparatus (not shown) may then be indexed or moved in direction T to position the contact rod 18 above the next region of the substrate 10 to be welded. As illustrated in FIG. 10B, the contact rod 18 is then driven against the substrate surface by force F and moved relative to the surface to generate friction heating. The contact rod 18 or other electrode regions are then energized at a voltage different than that of the substrate 10, resulting in an electric current and producing resistance heating.

Figure 10C:
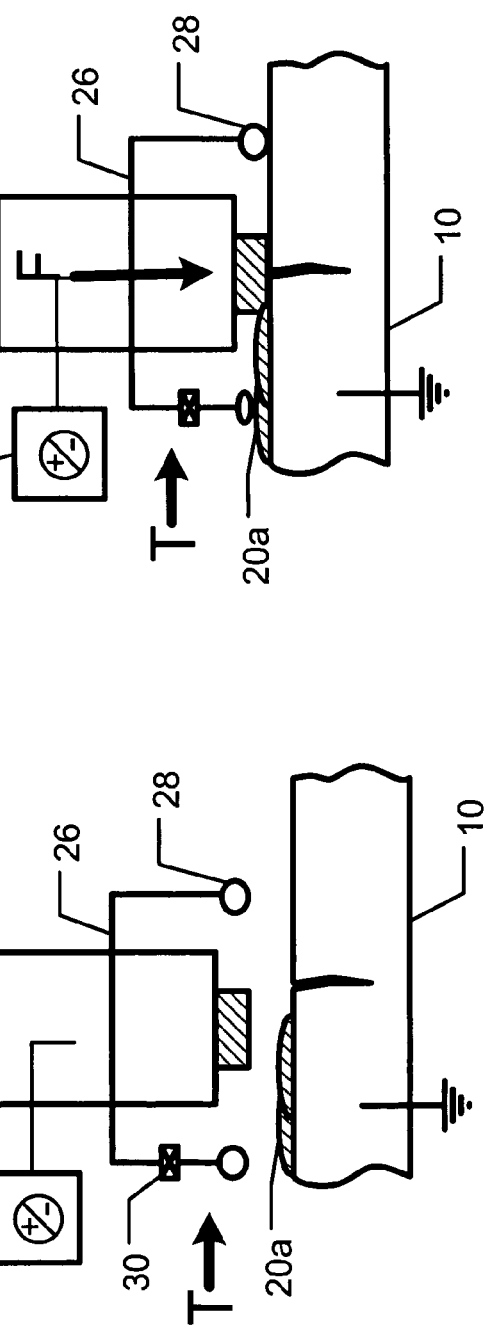
Figure 10D:
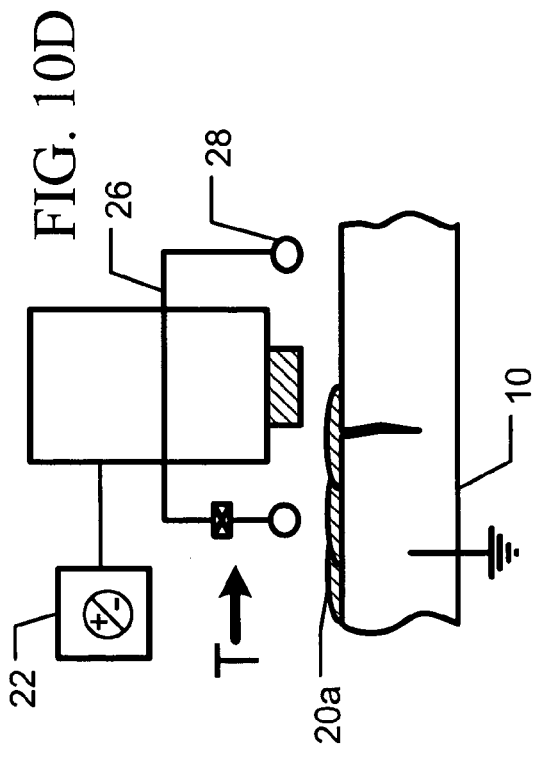

As illustrated in FIG. 10C, the combination of the frictional heating, the resistance heating and contact pressure cause a new portion 20a of the contact rod to be welded to the substrate 10. As illustrated in FIG. 10D, the contact rod 20 is then separated from the weld portion 20a and advanced to start the next welding cycle. The welding cycles may be repeated until the desired weld joint is completed, the cladding is applied or defect 12 is corrected, or the substrate is otherwise suitable for further processing.

Certain of the steps included in an alternative intermittent contact electrofriction process as described above are illustrated in FIGS. 11A–D. As illustrated in FIG. 11A, a welding step has been completed and the contact rod 20 has been withdrawn from the substrate 10. One or more elements (as illustrated, the contact rod 20) on or adjacent the contact rod housing 18 are maintained at a potential sufficient to generate an arc 40 between the energized element and one or more regions of the substrate 10. This arcing provides supplemental heating of the substrate 10 and/or the contact rod 20 during periods in which the contact rod is separated from the substrate surface. Depending on the output of the resistance welding supply, the retract distance and time, and the local geometry, the arc 40 may remain on and continue to heat (as well as clean and dry, as necessary) the substrate surface in preparation for hot-forging during the next contact cycle. The arc 40 may be maintained as the electrofriction welding apparatus (not shown) may then be indexed or moved in direction T to position the contact rod 18 above the next region of the substrate 10 to be welded. As illustrated in FIG. 11B, the contact rod 18 is then driven against the substrate surface by force F and moved relative to the surface to generate friction heating. The contact rod 18 or other electrode regions are then energized at a voltage different than that of the substrate 10, producing an electric current and generating resistance heating.

As illustrated in FIG. 11C, the combination of the frictional heating, the resistance heating, the preheating provided by the arc 40 and the contact pressure cause a new portion 20a of the contact rod to be welded to the substrate 10. As illustrated in FIG. 11D, the contact rod 20 is then separated from the weld portion 20a and advanced to start the next welding cycle with an arc 40 forming between an electrode and the substrate 10. The welding cycles may be repeated until the desired weld joint is completed, the cladding is applied or defect 12 is corrected, or the substrate is otherwise suitable for further processing.

Although the apparatus and methods above have been described in connection with correcting surface defects or applying a surface cladding, the apparatus and methods are equally suitable for welding separate work pieces together along close-fitting, i.e., faying surfaces. When contact rod and the two faying surfaces are periodically separated, the weld is allowed to cool and strengthen. Depending on the particular configuration of the electrofriction welding apparatus, the separation time may also allow the mechanical kinetic energy and/or electrical energy to be replenished, thereby allowing the electrofriction welding apparatus 100 to be made smaller while still having sufficient energy available to make at least one spot weld per contact period of the welding cycle.

In another variation of an electrofriction process, if the application of the electrical power is continued and, if the voltage is sufficiently high, an electric arc may be established and maintained for a time sufficient to help heat the upper layers of the work-piece and consumable surfaces. Depending on the output of the resistance welding supply, the retract distance and time, and the local geometry, the arc may remain on and continue to heat (as well as clean and dry, as necessary) the faying interfaces in preparation for hot-forging in the next period of the cycle. In an alternative exemplary embodiment, two or more components to be joined can be aligned in close proximity to the electrofriction welding apparatus 100 and can be joined in a manner similar to that described above. More particularly, when joining two or more separate component parts or rejoining a single cracked part, the component parts or crack may be aligned and positioned in a plane substantially parallel to the primary direction of motion T of the electrofriction welding apparatus 100. Sufficient mechanical force provided through repetitive motion of the positioning arm 16 and the contact rod 20 along the joint edges, coupled with a simultaneous or substantially simultaneous application of an electrical current from the power source 22 to generate heating at or near the point of contact between the contact rod and the surface of the substrate 10, raises the temperature of the components to a degree sufficient to allow for the solid state or semi-solid state deformation of material adjacent the contact area and/or a consumable material extending from the electrofriction welding apparatus 100 to connect the component parts. The end result is a bridge of material formed by forging the two substrate or crack edges together. The bridge material may include the substrate material(s), the consumable material or a mixture of the materials depending on the selection and relative characteristics of the substrate material(s) and the consumable material.

During a welding cycle, synchronization of the consumable material motion and the electrical supply output waveform can be used to maximize heating while keeping the melting, if any, to a minimum. If the electrofriction welding process is applied over a contaminated crack or other defect, the liquid metal formed (if melting occurs) can be forced into the locally dried portion of the crack or defect to displace contaminants, water, steam, or other materials, and prevent them from contaminating or displacing the weld pool. On the other hand, if the electrical power required for electrical heating is turned off before separating the contact rod 20 and the substrate, then no arc will be formed, no melting of the substrate or consumable material will occur and the weld will be substantially 100% solid-state. Particularly with respect to contaminated surfaces, however, the heat generated in the weld zone before establishing contact between the electrofriction welding apparatus and the substrate would tend to improve the drying of the crack or defect adjacent the welding zone.

For applications where the substrate is less sensitive to hot cracking when brought to its melting point, the consumable may be allowed to momentarily break its contact with the substrate while the electrical power is still applied, generating an electrical arc. This short duration arc can provide a more intense heat source, which can be tailored to melt an upper region of the substrate if maintained for a sufficient time and with a sufficient current. This additional heating can be favorably used to further reduce heating contribution required from the applied forces to generate the frictional heating and the resistance heating, as well as to increase the welding progression rate and reduce the tooling size and strength. The consumable material can be quickly brought in contact with the substrate surface again at a nearby, overlapping location to provide a substantially continuous region of the consumable material on the surface of the substrate and to generate a state of compressive stress in the cooling metal to suppress or reduce formation of defects such as cracks. An additional advantage of the melted upper region of the substrate is the reduction or elimination of the hot-worked microstructure at the critical surface location (by generation of a cast microstructure) that will be exposed to the operating environment once the component being welded is put into service.

For applications where the access is severely restricted and further reduction in tooling size, strength and power is required, the electrical resistance heating component can be momentarily reduced or turned off while the consumable is periodically retracted from the substrate. This "dabbing" or "daubing" process variation can allow the kinetic energy (rotational speed) of the consumable and its drive tooling to recover sufficiently to be ready to apply an adjacent, overlapping spot of welded material. The time during which the welded spot is above the forging temperature may also be reduced by internal conduction cooling that will occur during non-contact periods. Using this interrupted method, the power capability of the frictional drive tooling can be reduced below that required to produce a continuous, uninterrupted weld bead or deposit, which provided for no energy recovery period. In addition, the dabbing method can be used for achieving solid state welding using primarily resistance heating, primarily the friction heating method, or, preferably, a combination of at least the two heating methods, may allow further simplification or size reductions in the tooling required to obtain the necessary heating and forging pressure performance. This ability to further reduce the size of the electrofriction welding apparatus may be a critical factor for an application requiring welding in especially restricted or confined areas.

The electrofriction process provides several advantages over conventional methods of semi-solid state welding. For example, the electrofriction process reduces the forces and mechanical work required to perform a desired size weld as a result of achieving the required hot forging temperature in the weld zone using a combination of mechanical friction heating and electrical resistance heating applied simultaneously (or in close sequence) in the same weld zone or near-weld vicinity. Since the required process application forces are significantly reduced, the delivery tooling can be made much smaller and lighter, and may be able to move faster and more easily, thereby improving productivity and efficiency.

In addition, the relative motion of the components being joined, such as two separate articles or one article to which a consumable cladding material is being applied, provides a cleaning action of the mating surfaces, as well as improved homogenization of the weld zone, neither of which are significantly provided by convention resistance welding methods. Reduced heat penetration into the base metal(s) for achieving the desired low dilution or penetration at the high-electrical-resistance interface is also provided by the electrofriction process as it is in typical resistance welding, but which is absent in conventional friction welding. The scale of the welding beads may be maintained or increased by use of the combined heating method, and/or the tooling can be reduced in strength and size as required for a specific application.

Due to the concentration of the frictional and electrical resistance heat sources in the electrofriction process and the corresponding improvement in thermal efficiency of heating the zone to be hot forged and stirred, the size of the often metallurgically undesirable heat-affected zone (HAZ) may be reduced. This HAZ as is found, for example, in many austenitic-microstructure materials, often leads to unacceptable hot cracking and stress-corrosion cracking. As the size of this heated zone is reduced, the thermal strains and corresponding residual stresses developed during cooling are also reduced, thereby tending to provide an increased resistance to various types of delayed and in-service cracking.

The electrofriction welding process and apparatus according to the present invention may be used to mitigate or repair existing stress-corrosion cracking in Boiling Water Reactor (BWR) plant components, especially those components in helium-saturated regions of the reactor vessel shroud which are prone to hot-cracking when welded with conventional fusion-based processes. Other areas containing stress-corrosion or fatigue cracking that cannot be thoroughly dried before welding, or which must be welded in an underwater environment, and which are, therefore, more susceptible to defect-producing steam blowouts during conventional fusion welding, are also suitable candidates for application of the electrofriction welding process. Furthermore, electrofriction apparatus can be used in limited-access areas within the vessel where existing semi-solid state welding processes are difficult or impossible to apply because of the large size, strength and weight required of the process tooling.

The geometry of the electrofriction welding probe, i.e., the portion of the electrofriction welding apparatus that applies the mechanical pressure and electrical current to the area of contact on the work surface, may be varied to suit an application. For some cladding applications, the probe may be a cylindrical consumable and rotate relative to the work surface. In other cases, the probe may be non-circular, and translate relative to the work. The probe may also be nominally non-consumable, as would be used in the joining of two or more components, or for making attachments to a surface (such as when attaching studs) or plugging holes in a surface (such as when repairing cracks). In any of these cases, the frictional component of the substrate heating (and consumable, if used) is combined with the electrical resistance-heating component to obtain synergic heating benefits similar to those described for a cladding application.

The invention of this application has been described above both generically and with regard to specific embodiments. Although the invention has been set forth in what is believed to be the preferred embodiments, a wide variety of alternatives known to those of skill in the art can be selected

What I claim is:

1. A method of welding a solid consumable material to a base material within a welding zone comprising:

bringing a working surface of the consumable material into contact with a base surface of the base material, the working surface being urged against the base surface by a contact force, the contact force being applied generally along an axis substantially normal to the base surface;

moving the working surface relative to the base surface while maintaining the contact force, thereby generating frictional heating within the welding zone;

causing an electrical current to flow through the base material, the electrical current flowing through or closely adjacent the welding zone, thereby generating resistance heating within the welding zone;

wherein a cumulative heating of the welding zone by the frictional heating and the resistance heating, in combination with the contact force, are sufficient to weld a portion of the consumable material to the base surface within the welding zone, thereby forming a first weld spot; and withdrawing the consumable material from the base surface, thereby forming a new working surface.

2. A method of welding a solid consumable material to a base material according to claim 1, wherein:

the working surface of the consumable material is moved relative to the base surface using at least one motion selected from a group consisting of rotation, reciprocation, translation, oscillation, orbital rotation and arcuate motions.

3. A method of welding a solid consumable material to a base material according to claim 1, further comprising:

moving the working surface of the consumable material along the base surface in a weld direction to extend the weld spot and form an elongated weld bead, wherein the working surface has a maximum dimension $D_m$ in a direction perpendicular to the weld direction and wherein the elongated weld bead has
a width W, the width being less than about twice $D_m$, and
a length L, the length being substantially larger than $D_m$.

4. A method of applying a metallic material to a conductive base material according to claim 3, wherein:

the elongated weld bead is straight, curved or a combination of straight and curved portions.

5. A method of welding a solid consumable material to a base material according to claim 1, further comprising:

moving the working surface of the consumable material along the base surface in a weld direction to extend the weld spot and form an elongated weld bead, wherein the working surface has a maximum dimension $D_m$ in a direction perpendicular to the weld direction and wherein the elongated weld bead has
a width W, the width being greater than about twice $D_m$ and a length L, the length being substantially larger than $D_m$.

6. A method of applying a metallic material to a conductive base material according to claim 5, wherein:

the elongated weld bead is straight, curved or a combination of straight and curved portions.

7. A method of welding a solid consumable material to a weld region on a base material comprising:

preheating the weld region;

bringing a working surface of the consumable material into contact with a base surface of the base material, the working surface being urged against the base surface by a contact force, the contact force being applied generally along an axis substantially normal to the base surface;

moving the working surface relative to the base surface while maintaining the contact force, thereby generating frictional heating within the welding zone; and causing an electrical current to flow through the base material, the electrical current flowing through or closely adjacent the welding zone, thereby generating resistance heating within the welding zone;

wherein a cumulative heating of the welding zone by the preheating, the frictional heating and the resistance heating, in combination with the contact force, are sufficient to cause welding of a portion of the consumable material to the base surface within the welding zone.

8. A method of welding a solid consumable material to a weld region on a base material according to claim 7, wherein:

the preheating of the weld region is achieved using at least one heating method selected from induction heating, plasma arc heating, electric arc heating, tungsten inert gas (TIG) torch heating, laser heating and electron beam heating.

9. A method of welding a solid consumable material to a weld region on a base material comprising:

preheating a portion of the consumable material, the preheated portion including a working surface;

bringing the working surface of the consumable material into contact with a base surface of the base material, the working surface being urged against the base surface by a contact force, the contact force being applied generally along an axis substantially normal to the base surface;

moving the working surface relative to the base surface while maintaining the contact force, thereby generating frictional heating within the welding zone; and causing an electrical current to flow through the base material, the electrical current flowing through or closely adjacent the welding zone, thereby generating resistance heating within the welding zone;

wherein a cumulative heating of the welding zone by the preheating of the consumable material, the frictional heating and the resistance heating, in combination with the contact force, are sufficient to cause welding of a portion of the consumable material to the base surface within the welding zone.

10. A method of welding a solid consumable material to a weld region on a base material according to claim 9, wherein:

the preheating of the portion of the consumable material is achieved using at least one heating method selected from induction heating, plasma arc heating, electric arc heating, tungsten inert gas (TIG) torch heating, laser heating and electron beam heating.

11. A method of welding a solid consumable material to a weld region on a base material comprising:

preheating the weld region;

preheating a portion of the consumable material, the preheated portion including a working surface;

bringing the working surface of the consumable material into contact with the weld region on a surface of the base material under a contact force, the contact force being applied generally along an axis substantially normal to the weld region;

moving the working surface relative to the weld region while maintaining the contact and applying the contact force, thereby generating a quantity of frictional heating within the welding zone; and establishing an electrical current through the base material including or adjacent the welding zone, thereby generating a quantity of resistance heating within the welding zone;

wherein a cumulative heating of the welding zone by the frictional heating and the resistance heating, in combination with the contact force, are sufficient to cause welding of a portion of the consumable material to the surface of the base material within the welding zone.

12. A method of welding a solid consumable material to a weld region on a base material according to claim 11, wherein:

the preheating of the weld region is achieved using at least one method selected from induction heating, plasma arc heating, electric arc heating, tungsten inert gas (TIG) torch heating, laser heating and electron beam heating; and the preheating of the portion of the consumable material is achieved using at least one method selected from induction heating, plasma arc heating, electric arc heating, tungsten inert gas (TIG) torch heating, laser heating and electron beam heating.

13. A method of welding a consumable material to a weld region on a base material comprising:

bringing a working surface of a contact element into contact with a base surface in the weld region, the working surface being urged against the base surface by a contact force and the contact force being applied generally along an axis substantially normal to the base surface;

moving the working surface relative to the base surface while maintaining the contact force, thereby generating a quantity of frictional heating within the welding zone;

establishing an electrical current through the base material including or adjacent the welding zone, thereby generating a quantity of resistance heating within the welding zone; and applying the consumable material to the welding zone;

wherein a cumulative heating of the welding zone by the frictional heating and the resistance heating, in combination with the contact force, are sufficient to cause welding of the consumable material to the surface of the base material within the welding zone.

14. A method of welding a consumable material to a weld region on a base material according to claim 13, wherein:

applying the consumable material to the weld region includes contacting the weld region with a solid element prepared from the consumable material;

extruding a viscous composition prepared from the consumable material onto the weld region; or emitting a powder composition prepared from the consumable material onto the weld region.

15. A method of welding a consumable material to a weld region on a base material according to claim 14, wherein:

applying the consumable material to the weld region includes advancing the consumable material through an opening provided in the working surface of the contact element.

16. A method of welding a base material comprising:

bringing a working surface of a contact element into contact with the weld region on a surface of the base material under a contact force, the contact force being applied generally along an axis substantially normal to the weld region;

moving the working surface relative to the weld region while maintaining the contact and applying the contact force, thereby generating frictional heating within the welding zone; and causing an electrical current to flow through the base material at a region including or closely adjacent the welding zone, thereby generating resistance heating within the welding zone;

wherein the frictional heating and resistance heating are generated substantially simultaneously within the welding zone to cause a cumulative heating of the weld zone, and further wherein a combination of the cumulative heating of the welding zone and the contact force is sufficient to cause welding of a portion of the base material within the welding zone.

17. A method of welding a solid consumable material to a base material according to claim 1, further comprising:

repositioning the consumable material in a first weld direction relative to the base material;

bringing the new working surface of the consumable material into contact with the base surface, the new working surface being urged against the base surface by a contact force, the contact force being applied generally along an axis substantially normal to the base surface;

moving the new working surface relative to the base surface while maintaining the contact force, thereby generating frictional heating within the welding zone;

causing an electrical current to flow through the base material, the electrical current flowing through or closely adjacent the welding zone, thereby generating resistance heating within the welding zone;

wherein a cumulative heating of the welding zone by the frictional heating and the resistance heating, in combination with the contact force, are sufficient to weld a portion of the consumable material to the base surface within the welding zone, thereby forming a second weld spot; and withdrawing the consumable material from the base surface, thereby forming a new working surface.

18. A method of welding a solid consumable material to a base material according to claim 17, wherein:

the second weld spot at least partially overlaps the first weld spot.

19. An apparatus for welding a consumable material onto a base surface of a base material comprising:

a contact element;

a contact element housing, the contact housing arranged and configured to hold the contact element, selectively move the contact element in a plane substantially parallel to the base surface, selectively force a working surface of the contact element against the base surface in a weld zone with a contact force, the contact force being applied in a direction substantially normal to the surface, wherein the working surface of the contact element moves while in contact with the surface to generate frictional heating;

an electrode; and an electrical power supply, the electrical power supply being connected to the electrode and arranged to produce an electric current into the base material in the region of the weld zone;

wherein the electric current causes resistance heating of the weld zone, and further wherein the combination of frictional heating, resistance heating and contact force is sufficient to cause semi-solid state welding of the consumable material onto the weld zone.

20. An apparatus for welding a consumable material onto a surface of a base material according to claim 19, further comprising:

a supplemental heating element, the supplemental heating element being arranged in close proximity to the contact element for preheating of the weld zone, wherein the electric current causes resistance heating of the weld zone, and further wherein the combination of preheating, frictional heating, resistance heating and contact force is sufficient to cause semi-solid state welding of the consumable material onto the weld zone.

* * * * *